(12) United States Patent
Tsukada et al.

(10) Patent No.: US 8,127,635 B2
(45) Date of Patent: Mar. 6, 2012

(54) TWIN CLUTCH TRANSMISSION

(75) Inventors: Yoshiaki Tsukada, Saitama (JP); Takashi Ozeki, Saitama (JP); Hiroyuki Kojima, Saitama (JP); Yoshiaki Nedachi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 556 days.

(21) Appl. No.: 12/351,968

(22) Filed: Jan. 12, 2009

(65) Prior Publication Data

US 2009/0193918 A1 Aug. 6, 2009

(30) Foreign Application Priority Data

Jan. 31, 2008 (JP) ................................ 2008-021576

(51) Int. Cl.
*F16H 3/08* (2006.01)
(52) U.S. Cl. .......................................................... 74/331
(58) Field of Classification Search ................... None
See application file for complete search history.

(56) References Cited

U.S. PATENT DOCUMENTS

| 7,428,852 B2 * | 9/2008 | Baldwin et al. .............. 74/337.5 |
| 2002/0183162 A1 | 12/2002 | Ogawa et al. | |

FOREIGN PATENT DOCUMENTS

| DE | 10128854 A1 | 12/2002 |
| EP | 0831256 A2 | 3/1998 |
| EP | 1 617 108 A1 | 1/2006 |
| EP | 1 770 315 A1 | 4/2007 |
| JP | 2005-214215 A | 8/2005 |

* cited by examiner

*Primary Examiner* — Dirk Wright
(74) *Attorney, Agent, or Firm* — Birch, Stewart, Kolasch & Birch, LLP

(57) ABSTRACT

A twin clutch transmission for reducing the frequency of hit noise occurring in a dog clutch when shifting from neutral to a first speed. The twin clutch transmission includes a plurality of pairs of gears according to the number of speed stages between dual-structured main shafts and a countershaft. A twin clutch is disposed on the main shafts wherein a rotational drive force of an engine is transferred or blocked. A transmission between adjacent speed change gears on each shaft by a dog clutch occurs with a shift drum for switching between an engagement condition of the dog clutch by driving a shift fork. The patterns of guide grooves in the shift drum are formed wherein the dog clutches for a first speed gear and a second speed gear engage simultaneously when the shift drum is rotated by predetermined angles to shift from neutral to the first speed.

17 Claims, 5 Drawing Sheets

TWIN CLUTCH TRANSMISSION

CROSS-REFERENCE TO RELATED APPLICATIONS

The present application claims priority under 35 USC 119 to Japanese Patent Application No. 2008-021576 filed on Jan. 31, 2008 the entire contents of which are hereby incorporated by reference.

BACKGROUND OF THE INVENTION

1. Field of the Invention

The present invention relates to a twin clutch transmission, and more specifically to a twin clutch transmission capable of reducing the frequency of hit noises occurring in a dog clutch when shifting from neutral to a first speed.

2. Description of Background Art

A transmission is known that includes a plurality of pairs of gears between a main shaft and a countershaft wherein a speed change operation is performed by driving an axially, slidably supported sleeve or speed change gear by means of a shift fork.

JP-A No. 2005-214215 discloses the construction of a transmission wherein a shift fork is driven by a shift drum and wherein a synchronous engagement mechanism is provided for a sleeve that is driven by the shift fork. The synchronous engagement mechanism is a well-known mechanism disposed between a sleeve and a speed change gear that mesh with each other by sliding axially for allowing a smooth shift by synchronizing the rotations of both parts by sliding friction.

Normally, sequential transmissions using a shift drum do not employ the synchronous engagement mechanism as described above but often causes adjacent sleeves or change speed gears to engage with each other by means of a dog clutch comprising a plurality of dog teeth and dog recesses. In transmissions employing dog clutches, if there is a difference in the rotation speed between a main shaft and a countershaft, a hit noise may occur when engaging a dog clutch. Further, in a twin clutch transmission wherein its main shaft has a double structure composed of an inner main shaft and an outer main shaft and wherein a first clutch and a second clutch are provided that transmit rotation drive force of the inner main shaft and the outer main shaft respectively, it is possible to shift to an adjacent speed stage by switching the connection condition of a clutch. However, considering a hit noise occurring when engaging the dog clutch, there still is a room for improving the timing of engagement of a clutch at each shift gear.

FIG. 5 is a development view of a shift drum 100 of a conventional twin clutch transmission. SM1 and SM2 are guide grooves with which cylindrical convex portions 71b and 72b (shown by dotted lines) of a main shaft-side shift fork are to be engaged. SC1 and SC2 are guide grooves with which cylindrical convex portions 81b and 82b (shown by dotted lines) of a countershaft-side shift fork are to be engaged. When the rotational position of a shift drum 30 is at neutral (N), the cylindrical convex portions 81b and 82b are at the "C N-N" position shown on the left in the drawing while the cylindrical convex portions 71b and 72b are at the "M N-N" position shown on the right in drawing. Also, predetermined rotational positions following the "C N-N" shown on the left in the drawing and the predetermined rotational positions following the "M N-N" shown on the right in the drawing are set at 30 degree intervals, respectively.

At a neutral position, the cylindrical convex portions 81b, 82b, 71b, and 72b of each shift fork are at a middle, middle, right, and left positions respectively, and the dog clutch for each gear is not engaged. When the shift drum 30 is rotated up to the positions ("C 1-N" and "M 1-N") corresponding to the first speed gear from the neutral position, the cylindrical convex portion 81b shifts from a middle position to a left position to engage the dog clutch for the first speed gear (thick arrows in the drawing). At this time, the axial positions of the other cylindrical convex portions 71b, 72b, and 82b have not changed.

This twin clutch transmission is so configured that, when the dog clutch for first the speed gear is engaged to complete a shift to first speed, the shift drum 30 is automatically rotated by 30 degrees in the shift-up direction in preparation for shifting to the second speed. This rotary operation is called "preliminary shift for shift-up" which is intended to be able to complete a shift simply by switching the connection condition of the twin clutch when a speed change order to second speed is issued. The preliminary shift for shift-up causes the shift forks to move to the "C 1-2" and "M 1-2" positions shown on the left and right in the drawing, respectively. Also, the preliminary shift for shift-up causes the SC2 to switch from a middle position to a right position so as to move the cylindrical convex portion 82b to the right position, thereby engaging the dog clutch for a second speed gear.

As described above, in conventional twin clutch transmissions, since the dog clutch for a first speed gear and the dog clutch for a second speed gear engage with different timings, there is a possibility that a hit noise occurs twice in the dog clutch when shifting from neutral to a first speed.

SUMMARY AND OBJECTS OF THE INVENTION

An object of an embodiment of the present invention is to address the above-described problem associated with the prior art and to provide a twin clutch transmission capable of reducing the frequency of the hit noises occurring in a dog clutch when shifting from neutral to first speed.

To achieve the above-described object, according to an embodiment of the present invention, there is provided a twin clutch transmission comprising a transmission having a plurality of pairs of gears corresponding to the number of speed stages between a main shaft and a countershaft, and a twin clutch disposed on the main shaft that transfers or blocks rotation drive force of an engine to/from the transmission. The main shaft is composed of an inner main shaft and an outer main shaft that rotatably support the inner main shaft. The twin clutch is composed of a first clutch adapted to transfer or block a rotational drive force to be transmitted to the inner main shaft and a second clutch adapted to transfer or block a rotational drive force to be transmitted to the outer main shaft. The transmission is configured so that transmission of a rotational drive force between adjacent shift gears on each shaft is performed by a dog clutch consisting of a dog tooth and a dog recess. The transmission is configured to enable a gearshift between first speed and second speed to be made by switching the connection condition of the twin clutch while a dog clutch for transmitting rotation drive force by a first speed gear and a dog clutch for transmitting rotation drive force by a second speed gear are both engaging. A shift drum is provided for switching the engagement condition of the dog clutches using a shift fork adapted to be driven along a guide groove that is formed in a surface of the shift drum. The pattern of the guide groove is formed so that, when the shift drum is rotated by predetermined angles to shift from neutral to a first speed, both of the dog clutch for the first speed gear and the dog clutch for the second speed gear engage simultaneously.

Further, according to an embodiment of the present invention, the shift drum is driven to be rotated by an actuator.

Furthermore, according to an embodiment of the present invention, the pairs of gears include a slidable gear mounted axially slidably in order to select one pair of gears that transmits a rotational drive force to the countershaft and an unslidable gear mounted axially unslidably; the slidable gear is provided on each of the inner main shaft, outer main shaft, and countershaft; the dog clutch is provided between the slidable gear and the unslidable gear adjacent to the slidable gear on the same shaft; and rotation drive force is transferred or blocked between the slidable gear and the unslidable gear that are adjacent to each other on the same shaft by sliding the slidable gear by means of the shift fork.

Since the pattern of the guide groove in the shift drum is formed so that, when the shift drum is rotated by predetermined angles to shift from neutral to first speed, both of the dog clutch for a first speed gear and the dog clutch for a second speed gear engage simultaneously. Thus, it is possible to reduce the frequency of the hit noise occurring when shifting from neutral to the first speed to only once, unlike in the case where the pattern of the guide groove is formed so that, when shifting from neutral to first speed, the dog clutch for first speed engages first and then the dog clutch for second speed engages.

Since the shift drum is driven to rotate by the actuator, it is easy to electrically control the timing, angle, rotary speed, and the like of the rotation of the shift drum.

Since the pair of gears are composed of a slidable gear that is axially slidably mounted in order to select one pair of gears transmitting a rotational drive force to the countershaft, and an unslidable gear that is axially unslidably mounted; the slidable gear is provided on each of the inner main shaft, outer main shaft, and countershaft; a dog clutch is provided between the slidable gear and the unslidable gear adjacent to the slidable gear on the same shaft; and rotation drive force is transferred or blocked between the slidable gear and the unslidable gear that are adjacent to each other on the same shaft by sliding the slidable gear by the shift fork. Thus, it is possible to reduce the frequency of the hit noises occurring when shifting from neutral to the first speed in a twin clutch transmission adapted to engage or disengage the dog clutch by driving the slidable gear by means of the shift fork.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
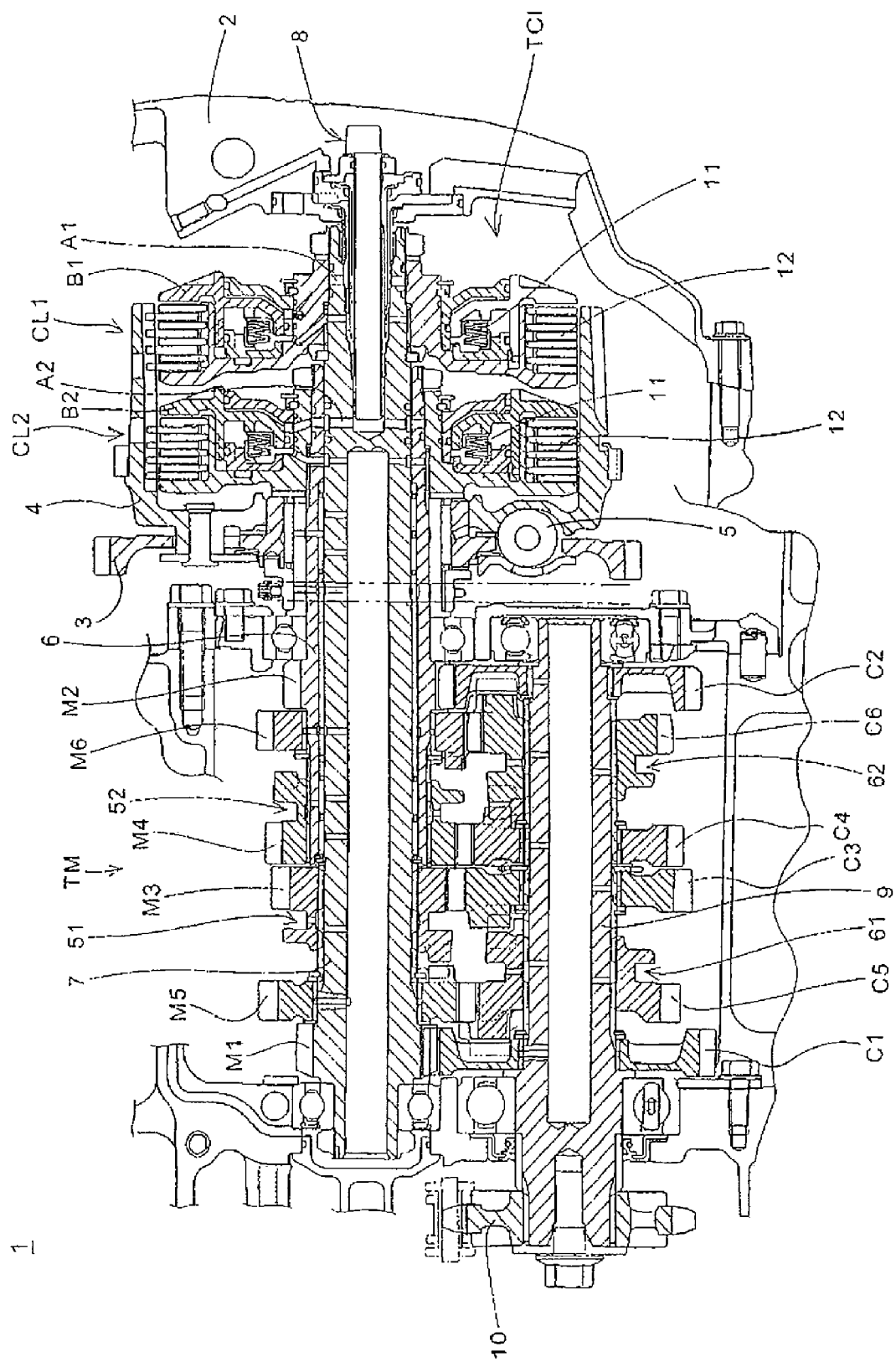
FIG. 1 is a sectional view of a twin clutch transmission according to one embodiment of the present invention.
Figure 2:
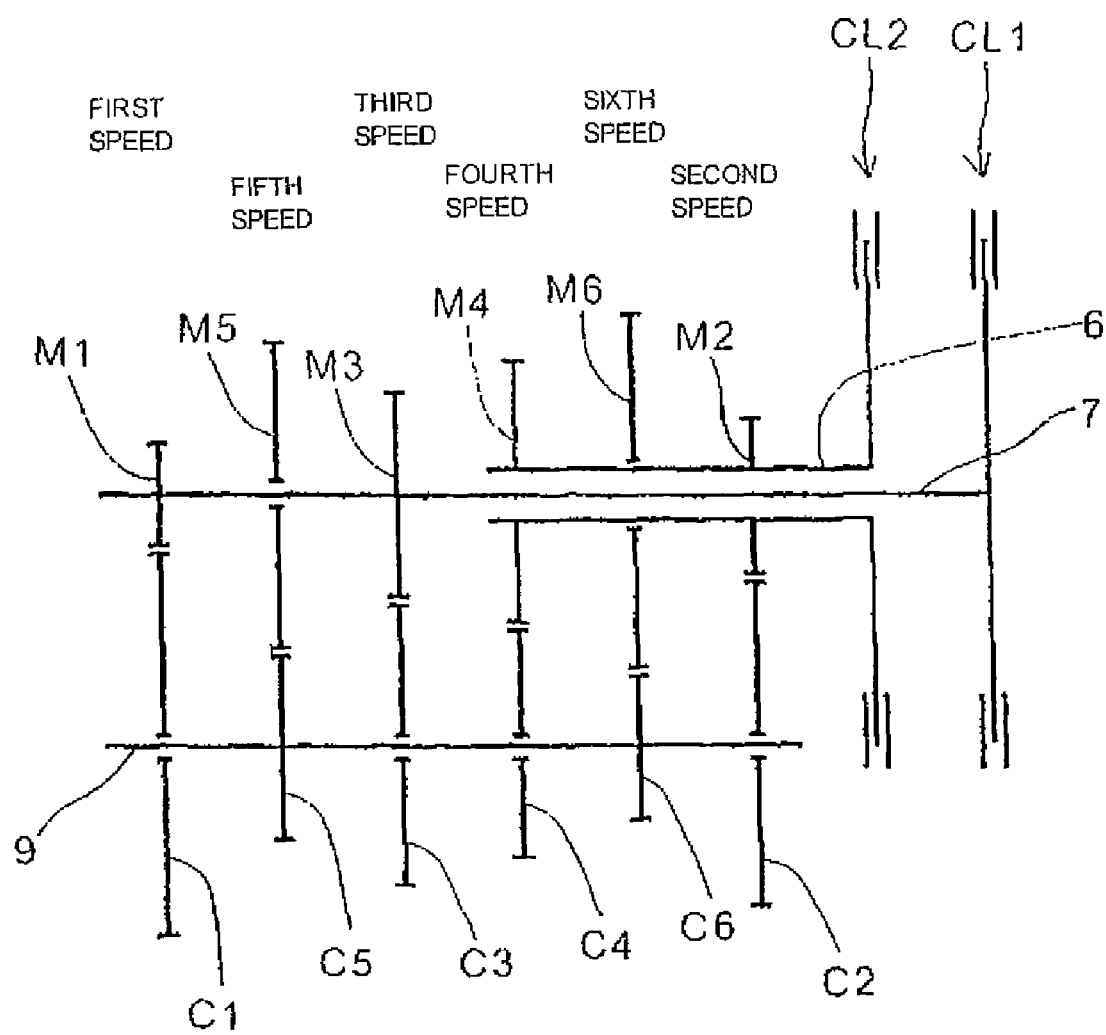
FIG. 2 is a skeleton diagram showing the positional relationship of speed change gears.

Preferred embodiments of the present invention will be described in detail below with reference to the drawings. FIG. 1 is a sectional view of a twin clutch transmission 1 according to one embodiment of the present invention. FIG. 2 is a skeleton diagram showing the arrangement of speed change gears of the twin clutch transmission 1. The twin clutch transmission 1 comprises a twin clutch TCL composed of a first clutch CL1 and a second clutch CL2 and a forward six-stage sequential transmission TM, and is housed in a crankcase 2 together with an engine serving as a power source.

A rotational drive force to be transmitted from a crankshaft (not shown) of the engine to a primary gear 3 having a shock absorbing mechanism 5 is output to a countershaft 9 equipped with a drive sprocket 10 through the twin clutch TCL, the outer main shaft 6 as an outer main spindle, the rotatably supported inner main shaft 7 as an inner main spindle, rotatable journaled to the outer main shaft, and six pairs of gears provided between the main shafts 6, 7 and the countershaft. Rotation drive force transmitted to the drive sprocket 10 is delivered to drive wheels (not shown) of a vehicle through a drive chain to be wound on the sprocket.

The transmission TM has six pairs of gears between the main shafts and the countershaft, and it is possible to select which pair of gears to rotate in order to output the rotational drive force based on a combination of the position of a slidable gear axially slidably mounted on each shaft and the engagement/disengagement condition of the first clutch CL1 and the second clutch CL2. The twin clutch TCL is disposed within a clutch case 4 rotating integrally with the primary gear 3. The first clutch CL1 is unrotatably mounted on the inner main shaft 7 and the second clutch CL2 is unrotatably mounted on the outer main shaft 6. Between the clutch case 4 and each of the clutches CL1 and CL2, a clutch plate 12 is disposed that is composed of four clutch plates unrotatably supported by the clutch case 4 and four friction plates unrotatably supported by each of the clutches CL1 and CL2.

The first clutch CL1 and the second clutch CL2 are so configured that they switch to a connection condition when a friction force is produced against the clutch plate 12 by a hydraulic pressure supplied from a hydraulic pump to be driven with the rotation of the crankshaft. In the wall of the crankcase 2, a divider 8 is embedded that forms two dual-tubular hydraulic paths inside the inner main shaft 7. When a hydraulic pressure is supplied to a hydraulic fluid path A1 formed in the inner main shaft through the divider 8, a piston B1 slides to the left in the drawing against the resilience of a resilient member such as a spring to switch the first clutch CL1 to the connected condition. Similarly, when hydraulic pressure is supplied to a hydraulic fluid path A2, a piston B2 slides to the left in the drawing to switch the second clutch CL2 to the connected condition. Then, when the supplied hydraulic pressure drops, the B1 and B2 of both clutches CL1 and CL2 return to the initial position by a resilience of the resilient member 11. Hydraulic pressure supply to the first clutch CL1 and the second clutch CL2 is performed by switching, with a solenoid valve or the like, the destination of the hydraulic pressure constantly generated by the hydraulic pump that is driven to turn by the crankshaft.

In the configuration described above, although the rotational drive force of the primary gear 3 only rotates the clutch case 4 unless a hydraulic pressure is supplied to the first clutch CL1 or the second clutch CL2, when a hydraulic pressure is supplied the outer main shaft 6 or the miner main shaft 7 is driven to rotate integrally with the clutch case 4. At this time, it is also possible to make a half-clutching condition by regulating the intensity of hydraulic pressure to be supplied.

The inner main shaft 7 connected to the first clutch CL1 supports the driving gears M1, M3 and M5 of odd-numbered speed stage gears (first speed, third speed, and fifth speed). The first speed driving gear M1 is formed integrally with the inner main shaft 7. The third speed driving gear M3 is axially slidably and circumferentially unrotatably mounted, and the fifth speed driving gear M5 is axially unslidably and circumferentially rotatably mounted.

On the other hand, the outer main shaft 6 connected to the second clutch CL2 supports the driving gears M2, M4, and M6 of even-numbered speed stages (second speed, fourth speed, and sixth speed). The second speed driving gear M2 formed integrally with the outer main shaft 7. The fourth speed driving gear M4 is axially slidably and circumferentially unrotatably mounted, and the sixth speed driving gear M6 is axially unslidably and circumferentially rotatably mounted.

Further, the countershaft 9 supports the driven gears C1 to C6 engaged with the driving gears M1 to M6. The first to fourth speed driven gears C1 to C4 are axially unslidably and circumferentially rotatably mounted, and the fifth and sixth speed driven gears C5 and C6 are axially slidably and circumferentially unrotatably mounted.

Of the gear train describe above, the driving gears M3 and M4 and the driven gears C5 and C6, that is, "slidable gears" which are axially slidable, are configured to slide with the movement of a shift fork described later, and these slidable gears are formed with engagement grooves 51, 52, 61, and 62 respectively with which a claw portion of the shift fork engages.

Also, the speed change gears (driving gears M1, M2, M5, M6 and driven gears C1 to C4) other than the slidable gears described above, that is, "unslidable gears" which are axially unslidable, are configured to transfer or block the rotational drive force between the slidable gears and the unslidable gears which are adjacent to each other. This configuration allows the twin clutch transmission 1 of this embodiment to arbitrarily select one pair of gears to transmit the rotational drive force based on a combination of the positions of the slidable gears and the connection/disconnection condition of both clutches CL1 and CL2.

In addition, since the first clutch CL1 transfers or blocks the rotational drive force between the odd-numbered speed stages (first speed, third speed, fifth speed), and the second clutch CL2 transfers or blocks the rotational drive force between the even-numbered speed stages (second speed, fourth speed, sixth speed), the connection conditions of the first clutch CL1 and the second clutch CL2 are alternately switched when shift-ups are performed sequentially.

In the twin clutch transmission 1 in this embodiment, a dog clutch mechanism is employed for transferring or blocking rotation drive force between a slidable gear and an unslidable gear. The dog clutch mechanism is adapted to transmit the rotational drive force by engaging its convex and concave portions consisting of dog teeth and dog recesses respectively, and this simple structure allows transmission of drive power with a few transmission losses.

Figure 3:
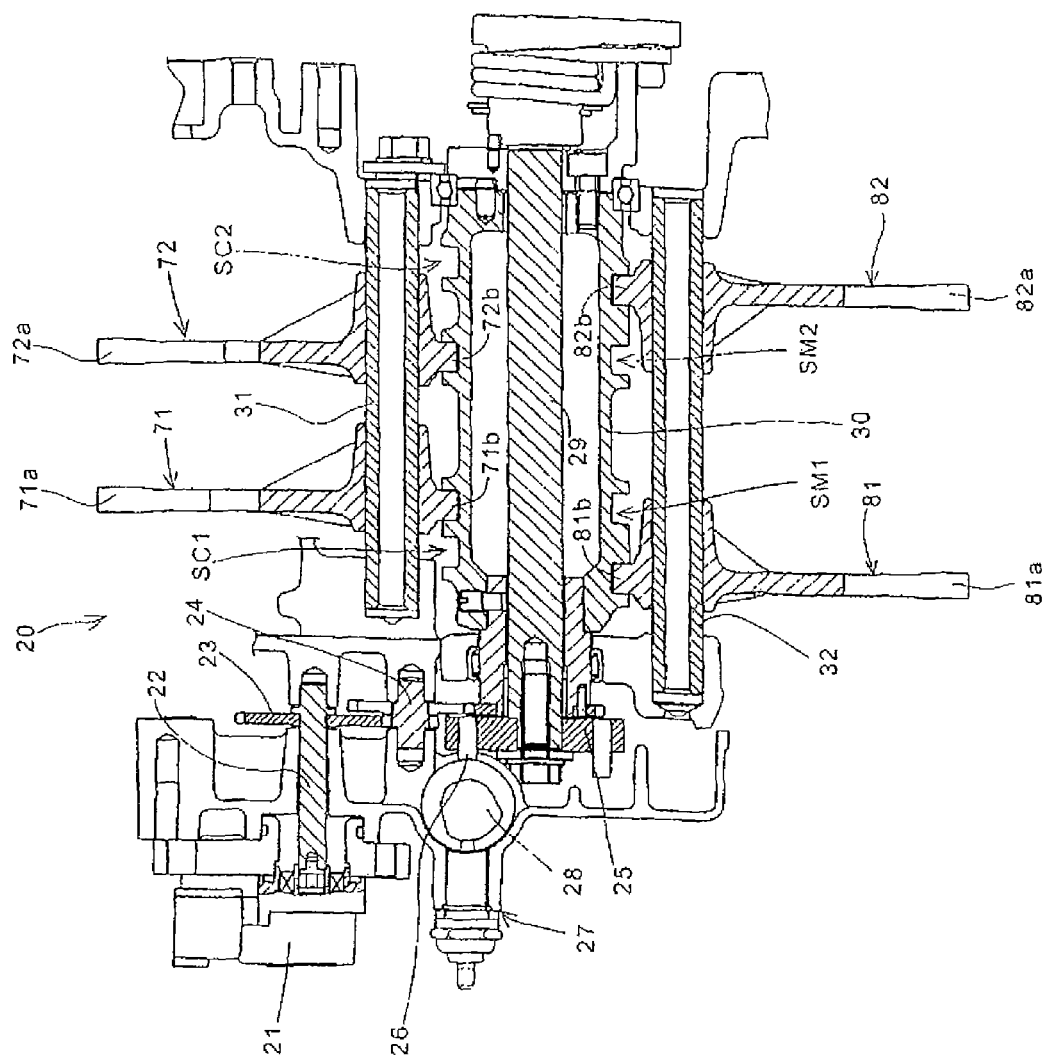
FIG. 3 is a sectional view of a speed change mechanism.

FIG. 3 is a sectional view of the speed change mechanism 20 adapted to drive the slidable gears of the transmission.

Figure 4:
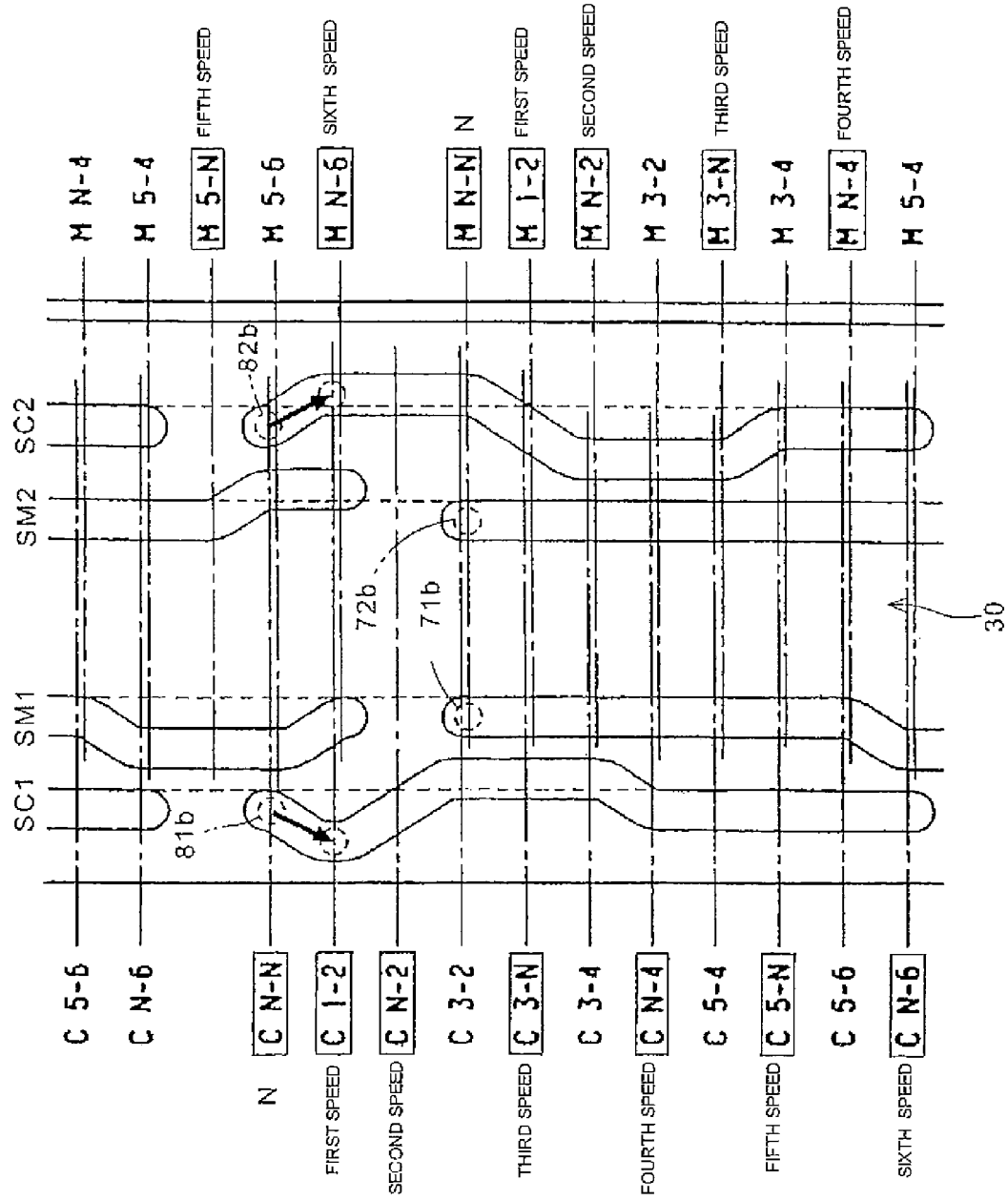
FIG. 4 is a development view showing the pattern of a guide groove in a shift drum according to one embodiment of the present invention.

FIG. 4 is a development view showing the shape (pattern) of the guide groove in the shift drum 30. The gear change mechanism 20 in this embodiment is equipped with four shift forks 71, 72, 81, and 82 slidably mounted on two guide shafts 31, 32 for driving the four slidable gears. The four shift forks each have guide claws (71a, 72a, 81a, and 82a) to engage with the slidable gears, and cylindrical convex portions (71b, 72b, 81b, and 82b) to engage with the guide grooves formed in the shift drum 30.

The guide shaft 31 has the shift fork 71 that engages with the third speed driving gear M3 and the shift fork 72 that engages with the fourth speed driving gear M4, and the guide shaft 32 on the outer side has the shift fork 81 that engages with the fifth speed driven gear C5 and the shift fork 82 that engages with the sixth speed driven gear C6.

On a surface of the shift drum 30 disposed parallel to the guide shafts 31 and 32, guide grooves SM1 and SM2 to engage with the main shaft-side shift forks 71 and 72 and guide grooves SC1 and SC2 to engage with the countershaft-side shift folks 81 and 82 are formed. This causes the slidable gears M3, M4, C5, and C6 to be driven along the patterns of the four guide grooves with the rotation of the shift drum 30.

The shift drum 30 is driven to rotate up to a predetermined position by an electric motor 21 serving as an actuator. A rotational drive force of the electric motor 21 is transmitted to a shift drum shaft 29 supporting the hollow cylindrical shift drum 30 through a first gear 23 fixed to a rotary shaft 22 and a second gear 24 that engages with the first gear 23. A gear position sensor 27 detects the rotary position of the shift drum 30 based on the rotary position of a earn 28 that is rotated by a pin 26 embedded in a shifter 25 fixed to the shift drum shaft 29.

In the configuration as described above, the twin clutch transmission 1 enables an automatic shift operation based on engine revolution and automobile speed, or a semiautomatic shift operation that allows the driver to perform a shift operation by means of a shift switch or the like by concurrently performing control of rotation/driving of the shift drum 30 and control of connection/disconnection of the twin clutch TCL.

With reference to the development view of FIG. 4, the positions of the four shift forks relative to a rotational position of the shift drum 30 are described below. The guide shafts 31 and 32 are disposed about 90 degrees circumferentially away from the rotational axis of the shift drum 30. For example, when the rotational position of the shift drum 30 is at neutral (N) the shift forks 81 and 82 are at the "C N-N" position shown on the left in the drawing, and the shift forks 71 and 72 are at the "M N-N" position shown on the right in the drawing. In this drawing, the cylindrical convex portions (71b, 72b, 81b, and 82b) of each shift fork at neutral are shown by dotted lines. Also, predetermined rotational positions following the "C N-N" shown on the left in the drawing and predetermined rotational positions following the "M N-N" shown on the right in the drawing are set at 30 degree intervals, respectively.

For the slide position of a shift fork that is determined by each guide groove, the guide grooves SM1 and SM2 for the main shaft are configured to have two positions, "left position" or "right position", while the guide grooves SC1 and SC2 for the countershaft are configured to have three positions, "left position," "middle position," or "right position."

When the shift drum is at the neutral position, the shift forks are at the middle position for shift fork 81, the middle position for shift fork 82, the right position for shift fork 71, and the left position for shift fork 72, respectively. This is a condition where none of the four slidable gears to be driven by respective shift forks are not engaged with the adjacent unslidable gears, and therefore even if the first clutch CL1 or the second clutch CL2 is connected the rotational drive force of the primary gear 3 is not transmitted to the countershaft 9.

Next, when the shift drum 30 is rotated from the above-described neutral position to a position ("C 1-2" and "M 1-2") corresponding to the first speed gear, the shift fork 81 is switched from the middle position to the left position and thereby the fifth speed driven gear C5 is switched from the middle position to the left position. This makes it ready for the fifth speed driven gear C5 to engage with the first speed driven gear C1 through the dog clutch so as to transmit the rotational drive force by means of the first speed gear. Also, at the same time, the shift fork 82 is switched from the middle position to the right position and thereby the sixth speed driven gear C6 is switched from the middle position to the right position. This makes it ready for the sixth speed driven gear C6 to engage with the second speed driven gear C2 through the dog clutch so as to transmit the rotational drive force by means of the second speed gear. At this time, axial positions of the other shift forks 71, 72 have not changed.

That is, the twin clutch transmission in this embodiment is so configured that, when the shift drum 30 is rotated from the neutral position to a position corresponding to the first speed gear, the dog clutch for the first speed gear and the dog clutch for the second speed gear engage simultaneously (refer to the thick arrow in drawing). Accordingly, the hit noise occurs only once in the dog clutch when shifting from the neutral position to the first speed gear. A difference in a gear change ratio between the first speed and the second speed is larger than that between other gear stages and hit noise occurring when engaging the dog clutch for the second speed tends to be higher, but the possibility of an occupant becoming aware of the hit noises is reduced due to a decreased frequency of noise.

Figure 5:
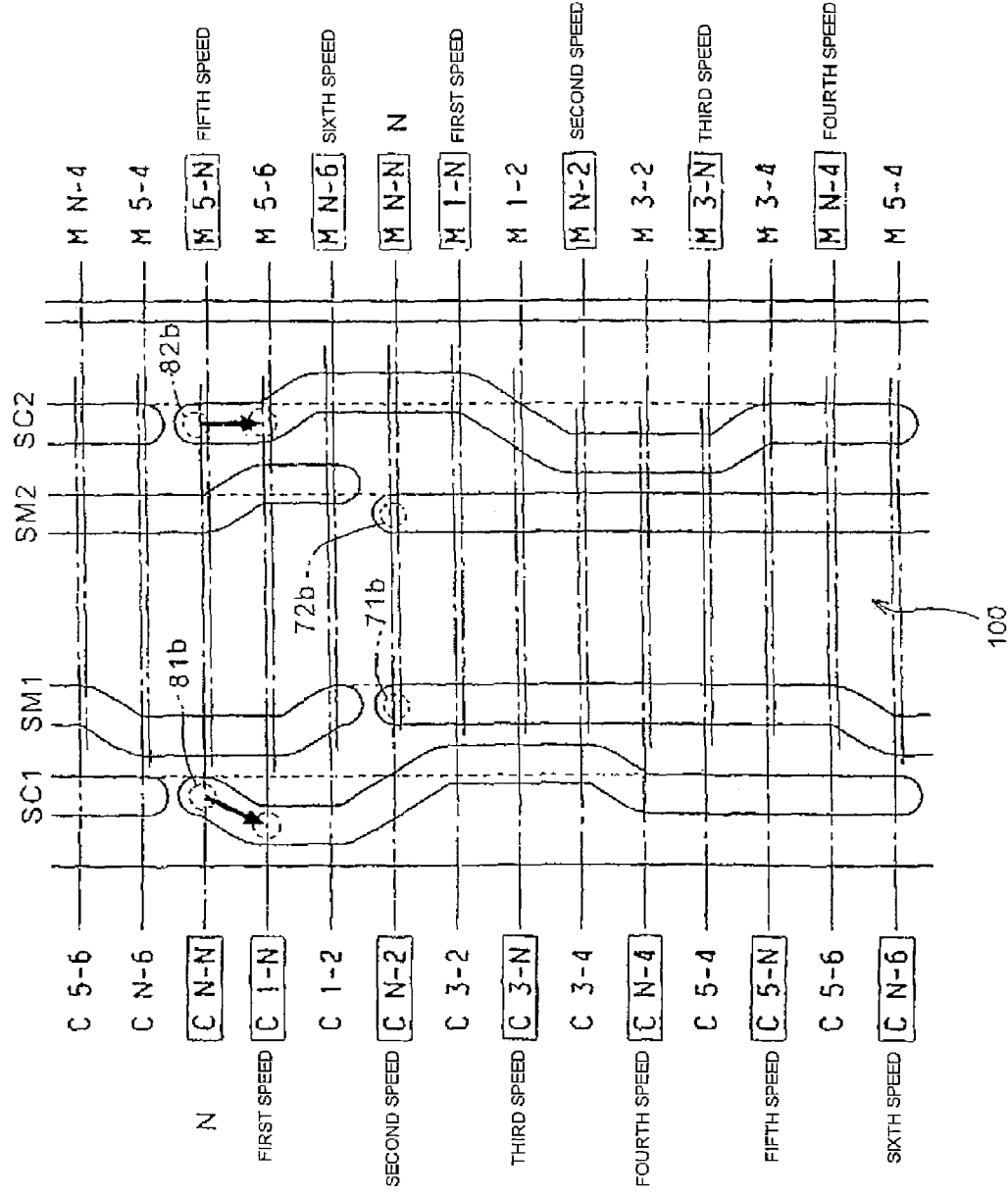
FIG. 5 is a development view showing the pattern of a guide groove in a shift drum in the past.

The shift drum 100 in the past shown in FIG. 5 is so configured that, when the shift drum 100 is rotated from the neutral position to a position corresponding to the first speed gear, only the dog clutch for the first speed gear engages, and then when the first clutch CL1 is switched to a connected condition to complete the shift to the first speed gear, the dog clutch for the second speed gear is engaged by "shift-up side preliminary speed change" to automatically rotate the shift drum 100 by 30 degrees in the shift-up direction. That is, in the shift drum 100 in the past, since the dog clutch for the first gear and the dog clutch for the second gear engage with different timings when shifting from the neutral position to the first speed gear, there is a possibility that hit noise occurs twice in the dog clutch when shifting from neutral to the first speed.

In the shift drum 30 in this embodiment, the dog clutch for the second speed gear engages simultaneously with the engagement of the dog clutch for the first speed gear when shifting from neutral to the first speed gear, that is, the "shift-up side preliminary speed change" in the shift drum in the past is performed at the same time. In this condition, when the first clutch CL1 is switched to connection condition, rotation drive force is transmitted in the order of inner main shaft 7, the first speed driving gear M1, the first speed driven gear C1, the fifth speed driven gear C5, and the countershaft 9, and is output from a drive sprocket 10. When the first clutch CL1 is connected and the first speed gear is selected, the second clutch CL2 is in the disconnected state. Therefore, the outer main shaft 6 is driven to rotate by the viscosity of a lubricant filled between the inner main shaft 6 and the outer main shaft 7.

Further, when a speed change order from first speed to second speed is issued in this state, the first clutch CL1 is disconnected and the second clutch CL2 is switched to the connected condition, and transmission path of rotation drive force is switched in the order of the outer main shaft 6, the second speed driving gear M2, the second speed driven gear C2, the sixth speed driven gear C6, and the countershaft 9.

The shift drum 30 of this embodiment and the shift drum 100 in the past are different only in the pattern of shifting from neutral to the first speed and are the same in the other patterns. Also, in the shift drum 30 of this embodiment, since the first speed dog clutch and the second speed dog clutch engage simultaneously when shifting from neutral to fast speed, the "C 1-N" and "M 1-N" positions in the shift drum 100 in the past are not necessary. Thus, the overall length of the guide grooves SC1, SC2, and M1, M2 are shortened by one predetermined rotation angle (30 degrees).

Next, on completion of the first speed to second speed shift operation, the shift-up side preliminary speed change is performed that allows a shift operation from second speed to third speed to be completed simply by switching the twin clutch TCL. In this second speed to third speed shift-up side preliminary speed change, the guide shaft for the countershaft moves from "C 1-2" to "C 3-2" position shown on the left in the drawing and also the guide shaft for the main shaft moves from "M 1-2" to "M 3-2" position shown on the right in the drawing. As to displacement of the guide grooves with this movement, only the guide groove SC1 is switched from the left position to the right position, and thereby the shift fork 81 moves from the left position to the right position to bring the fifth speed driven gear C5 and the third speed driven gear C3 into engagement with each other by means of the dog clutch.

On completion of the second speed to third speed shift-up preliminary speed change, the connection of the twin clutch TCL is switched from the second clutch CL1 to the first clutch CL2. That is, the operation to shift from second speed to third speed can be performed simply by switching the clutch. This shift-up preliminary speed change is performed in the same manner until the fifth speed gear is selected.

Upon the above-described shift-up speed change from second to third speed, the guide groove SC1 passes the middle position at "C N-2" shown on the left in the drawing, i.e., a position where the dog clutch does not engage. For the shift drum 30, angles are detected at 30 degree intervals by the gear position sensor 27 and also its rotary speed can be finely regulated by the electric motor 21. This makes it possible, for example, to make the rotary speed from "C 1-2" to "C N-2" shown on the left in the drawing, i.e., the speed when the dog clutch disengages between the driven gears C1 and C5, different from the rotary speed from "C N-2" to "C 3-2", i.e., the speed when the dog clutch engages between the driven gears C5 and C3, and also allow "waiting for neutral," i.e., stopping for a predetermined time at the "C N-2" position. This enables a substantial reduction of shift shocks liable to occur when the dog clutch engages or disengages. It is also possible to sequentially regulate the drive timing and drive speed of the shift drum 30 according to the number of speed stages, engine revolution, and the like when changing speed.

As described above, in the twin clutch transmission of the present invention, since the pattern of the guide groove in the shift drum is formed so that, when the shift drum is rotated by predetermined angles to shift from neutral to first speed, the dog clutches for the first gear and second gear are simultaneously engage, it is possible to reduce the frequency of the hit noise occurring in the dog clutch, as compared with the pattern of the guide groove formed so that, when shifting from neutral to the first speed, only the dog clutch for the first speed engages first and then the dog clutch for second speed engages.

The configuration, such as the number of speed stages, of the twin clutch transmission, the pattern of the guide groove in the shift drum, and the like are not limited to the embodiment described above but can be modified variously. For example, if the twin clutch transmission is so configured that the dog clutches for first speed and second speed engage simultaneously when shifting from neutral to the first speed, it is possible to change the number of shift forks according to the number of speed stages and the like and also to change the pattern of the guide groove in the shift drum accordingly. Further, the pattern of the guide groove in the shift drum according to the present invention is effective even when a shift-up preliminary speed change is not performed with the timing as described in the above embodiment. The speed change gears of the transmission may include a reverse stage.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A twin clutch transmission comprising:
   a transmission having a plurality of pairs of gears corresponding to the number of speed stages between a main shaft and a countershaft; and
   a twin clutch disposed on the main shaft,
   the twin clutch transmission being adapted to transfer or block a rotational drive force of an engine to/from the transmission by means of the twin clutch,
   wherein the main shaft includes an inner main shaft and an outer main shaft rotatably supporting the inner main shaft;
   the twin clutch includes a first clutch adapted to transfer or block rotation drive force to be transmitted to the inner main shaft, and a second clutch adapted to transfer or block the rotational drive force to be transmitted to the outer main shaft;
   the transmission is configured to perform the transmission of the rotational drive force between adjacent speed change gears on each shaft by a dog clutch having a dog tooth and a dog recess;
   the transmission is so configured that, when a dog clutch to transmit the rotational drive force with a first speed gear and a dog clutch to transmit rotation drive force with a second speed gear are both engaged, speed is changed between first speed and second speed by switching a connected condition of the twin clutch;
   a shift drum is provided to switch an engagement condition of the dog clutch by driving a shift fork;
   the shift fork is configured to be driven along a guide groove formed in a surface of the shift drum; and
   the pattern of the guide groove is formed so that, when the shift drum is rotated by predetermined angles to change speed from neutral to first speed, the dog clutch for the first speed gear and the dog clutch for the second speed gear simultaneously engage,
   wherein the pair of gears comprises a slidable gear that is axially slidably mounted to select one pair of gears operable to transmit a rotary drive force to the countershaft, and a unslidable gear mounted axially unslidably;
   the slidable gear is provided on each of the inner main shaft, the outer main shaft, and the countershaft;
   the dog clutch is provided between the slidable gear and the unslidable gear adjacent to the slidable gear on the same shaft; and
   the rotational drive force is transferred or blocked between the slidable gear and the unslidable gear that are adjacent to each other on the same shaft by sliding the slidable gear by means of the shift fork.

2. The twin clutch transmission according to claim 1, wherein the shift drum is driven to rotate by an actuator.

3. The twin clutch transmission according to claim 1, wherein the inner main shaft operatively connected to the first clutch supports the driving gears for odd-numbered speed stage gears.

4. The twin clutch transmission according to claim 3, wherein the first speed driving gear is integrally formed with the inner main shaft, the third speed gear is axially slidably and circumferentially unrotatably mounted relative to the inner main shaft and a fifth speed gear is axially unslidably and circumferentially rotatably mounted relative to the inner main shaft.

5. The twin clutch transmission according to claim 1, wherein the outer main shaft operatively connected to the second clutch supports the driving gears for even-numbered speed stage gears.

6. The twin clutch transmission according to claim 5, wherein the second speed driving gear is integrally formed with the outer main shall, the fourth speed gear is axially slidably and circumferentially unrotatably mounted relative to the outer main shaft and a sixth speed gear is axially unslidably and circumferentially rotatably mounted relative to the outer main shall.

7. The twin clutch transmission according to claim 4, wherein the countershaft includes driven gear operatively engaged with the driving gears on the inner main shaft with first, second, third and fourth driven gears being axially unslidably and circumferentially rotatably mounted relative to the countershaft and with fifth and sixth driven gears being axially slidably and circumferentially unrotatably mounted relative to the countershaft.

8. The twin clutch transmission according to claim 1, wherein the dog clutch transfers or blocks the rotational drive force between a slidably gear and an unslidable gear by engaging convex and concave portions consisting of dog teeth and dog recesses for allowing transmission of the drive power with few transmission loss.

9. A twin clutch transmission comprising:
   a transmission having a plurality of pairs of gears corresponding to the number of speed stages between a main shaft and a countershaft; and
   a first clutch operatively positioned on an inner main shaft;
   a second clutch operatively positioned on an outer main shaft;
   the first and second clutches being adapted to transfer or block a rotational drive force of an engine to/from the transmission;
   wherein the outer main shaft rotatably supports the inner main shaft;
   the first clutch is adapted to transfer or block rotation drive force to be transmitted to the inner main shaft, and the second clutch is adapted to transfer or block the rotational drive force to be transmitted to the outer main shaft;
   the transmission is configured to perform the transmission of the rotational drive force between adjacent speed change gears on each shaft by a dog clutch having a dog tooth and a dog recess;
   wherein when a dog clutch transmitting the rotational drive force with a first speed gear and a dog clutch transmitting rotation drive force with a second speed gear are both engaged, speed is changed between first speed and second speed by switching a connected condition of the twin clutch;

a shift drum is operatively provided to switch an engagement condition of the dog clutch by driving a shift fork;

the shift fork is configured to be driven along a guide groove formed in a surface of the shift drum; and the pattern of the guide groove is formed so that, when the shift drum is rotated by predetermined angles to change speed from neutral to first speed, the dog clutch for the first speed gear and the dog clutch for the second speed gear simultaneously engage, wherein the inner main shaft operatively connected to the first clutch supports the driving gears for odd-numbered speed stage gears, wherein the first speed driving gear is integrally formed with the inner main shaft, the third speed gear is axially slidably and circumferentially unrotatably mounted relative to the inner main shaft and a fifth speed gear is axially unslidably and circumferentially rotatably mounted relative to the inner main shall.

10. The twin clutch transmission according to claim 9, wherein the shift drum is driven to rotate by an actuator.

11. The twin clutch transmission according to claim 9, wherein the pair of gears comprise a slidable gear that is axially slidably mounted to select one pair of gears operable to transmit a rotary drive force to the countershaft, and a unslidable gear mounted axially unslidably;

the slidable gear is provided on each of the inner main shaft, the outer main shaft, and the countershaft;

the dog clutch is provided between the slidable gear and the unslidable gear adjacent to the slidable gear on the same shaft; and the rotational drive force is transferred or blocked between the slidable gear and the unslidable gear that are adjacent to each other on the same shaft by sliding the slidable gear by means of the shift fork.

12. The twin clutch transmission according to claim 10, wherein the pair of gears comprise a slidable gear that is axially slidably mounted to select one pair of gears operable to transmit a rotary drive force to the countershaft, and a unslidable gear mounted axially unslidably;

the slidable gear is provided on each of the inner main shaft, the outer main shaft, and the countershaft;

the dog clutch is provided between the slidable gear and the unslidable gear adjacent to the slidable gear on the same shaft; and the rotational drive force is transferred or blocked between the slidable gear and the unslidable gear that are adjacent to each other on the same shaft by sliding the slidable gear by means of the shift fork.

13. The twin clutch transmission according to claim 9, wherein the outer main shaft operatively connected to the second clutch supports the driving gears for even-numbered speed stage gears.

14. The twin clutch transmission according to claim 13, wherein the second speed driving gear is integrally formed with the outer main shaft, the fourth speed gear is axially slidably and circumferentially unrotatably mounted relative to the outer main shaft and a sixth speed gear is axially unslidably and circumferentially rotatably mounted relative to the outer main shaft.

15. The twin clutch transmission according to claim 9, wherein the countershaft includes driven gear operatively engaged with the driving gears on the inner main shaft with first, second, third and fourth driven gears being axially unslidably and circumferentially rotatably mounted relative to the countershaft and with fifth and sixth driven gears being axially slidably and circumferentially unrotatably mounted relative to the countershaft.

16. The twin clutch transmission according to claim 9, wherein the dog clutch transfers or blocks the rotational drive force between a slidable gear and an unslidable gear by engaging convex and concave portions consisting of dog teeth and dog recesses for allowing transmission of the drive power with few transmission loss.

17. A twin clutch transmission comprising:

a transmission having a plurality of pairs of gears corresponding to the number of speed stages between a main shaft and a countershaft; and a first clutch operatively positioned on an inner main shaft, a second clutch operatively positioned on an outer main shaft;

the first and second clutches being adapted to transfer or block a rotational drive force of an engine to/from the transmission;

wherein the outer main shaft rotatably supports the inner main shaft;

the first clutch is adapted to transfer or block rotation drive force to be transmitted to the inner main shaft, and the second clutch is adapted to transfer or block the rotational drive force to be transmitted to the outer main shaft;

the transmission is configured to perform the transmission of the rotational drive force between adjacent speed change gears on each shaft by a dog clutch having a dog tooth and a dog recess;

wherein when a dog clutch transmitting the rotational drive force with a first speed gear and a dog clutch transmitting rotation drive force with a second speed gear are both engaged, speed is changed between first speed and second speed by switching a connected condition of the twin clutch;

a shift drum is operatively provided to switch an engagement condition of the dog clutch by driving a shift fork;

the shift fork is configured to be driven along a guide groove formed in a surface of the shift drum; and the pattern of the guide groove is formed so that, when the shift drum is rotated by predetermined angles to change speed from neutral to first speed, the dog clutch for the first speed gear and the dog clutch for the second speed gear simultaneously engage, wherein the outer main shaft operatively connected to the second clutch supports the driving gears for even-numbered speed stage gears, and wherein the second speed driving gear is integrally formed with the outer main shall, the fourth speed gear is axially slidably and circumferentially unrotatably mounted relative to the outer main shaft and a sixth speed gear is axially unslidably and circumferentially rotatably mounted relative to the outer main shaft.

* * * * *